(12) United States Patent
Abedini et al.

(10) Patent No.: US 12,047,125 B2
(45) Date of Patent: Jul. 23, 2024

(54) TECHNIQUES FOR SELF-INTERFERENCE MEASUREMENT FOR A REPEATER NODE

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/387,593

(22) Filed: Jul. 28, 2021

(65) Prior Publication Data

US 2022/0045775 A1    Feb. 10, 2022

Related U.S. Application Data

(60) Provisional application No. 62/706,174, filed on Aug. 4, 2020.

(51) Int. Cl.
*H04B 17/40* (2015.01)
*H04B 7/155* (2006.01)
*H04L 5/14* (2006.01)

(52) U.S. Cl.
CPC ......... *H04B 17/40* (2015.01); *H04B 7/15542* (2013.01); *H04L 5/1461* (2013.01)

(58) Field of Classification Search
CPC .... H04B 17/40; H04B 7/15542; H04B 17/14; H04B 7/15528; H04B 1/525; H04L 5/1461; H04L 5/0062
See application file for complete search history.

(56) References Cited

U.S. PATENT DOCUMENTS

| | | | |
|---|---|---|---|
| 2010/0272005 A1* | 10/2010 | Larsson | H04B 7/15564 455/24 |
| 2013/0044621 A1 | 2/2013 | Jung et al. | |
| 2013/0279399 A1* | 10/2013 | Wilhelmsson | H04B 7/15585 370/315 |
| 2014/0133411 A1 | 5/2014 | Park et al. | |
| 2019/0222296 A1* | 7/2019 | Khandani | H04B 7/086 |
| 2020/0052775 A1 | 2/2020 | Nam et al. | |
| 2021/0083758 A1* | 3/2021 | Tarighat Mehrabani | H04B 7/15578 |
| 2021/0143895 A1* | 5/2021 | Kim | H04B 7/15528 |
| 2022/0232481 A1* | 7/2022 | Kusashima | H04W 52/10 |

FOREIGN PATENT DOCUMENTS

EP    3627724 A1    3/2020

OTHER PUBLICATIONS

International Search Report and Written Opinion—PCT/US2021/071040—ISA/EPO—Nov. 26, 2021.

* cited by examiner

*Primary Examiner* — Jae Y Lee
*Assistant Examiner* — Aixa A Guadalupe Cruz
(74) *Attorney, Agent, or Firm* — Dalei Dong; Harrity & Harrity, LLP

(57) ABSTRACT

Various aspects of the present disclosure generally relate to wireless communication. In some aspects, a control node may transmit, to a repeater node, full duplex configuration information. The control node may determine, based at least in part on a signal transmitted by the repeater node, a self-interference of the repeater node associated with the signal. Numerous other aspects are provided.

30 Claims, 12 Drawing Sheets

TECHNIQUES FOR SELF-INTERFERENCE MEASUREMENT FOR A REPEATER NODE

CROSS-REFERENCE TO RELATED APPLICATION

This Patent Application claims priority to U.S. Provisional Patent Application No. 62/706,174, filed on Aug. 4, 2020, entitled "TECHNIQUES FOR SELF-INTERFERENCE MEASUREMENT FOR A REPEATER NODE," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for self-interference measurement for a repeater node.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a control node includes: transmitting, to a repeater node, full duplex configuration information; and determining, based at least in part on a signal transmitted by the repeater node, a self-interference of the repeater node associated with the signal.

In some aspects, a method of wireless communication performed by a repeater node includes: transmitting and receiving a signal for self-interference measurement; and transmitting, to a control node, one or more of a copy of the signal or an indication of a parameter of the signal based at least in part on the reception of the signal.

In some aspects, a method of wireless communication performed by a control node includes: receiving, from a repeater node, a signal for self-interference measurement of the repeater node; and determining self-interference of the repeater node based at least in part on reception of one or more of a copy of the signal or an indication of a parameter of the signal that is based at least in part on the reception of the signal by the repeater node.

In some aspects, a control node for wireless communication includes a memory and one or more processors coupled to the memory, the one or more processors configured to: transmit, to a repeater node, full duplex configuration information; and determine, based at least in part on a signal transmitted by the repeater node, a self-interference of the repeater node associated with the signal.

In some aspects, a repeater node for wireless communication includes a memory and one or more processors coupled to the memory, the one or more processors configured to: transmit and receive a signal for self-interference measurement; and transmit, to a control node, one or more of a copy of the signal or an indication of a parameter of the signal based at least in part on the reception of the signal.

In some aspects, a control node for wireless communication includes a memory and one or more processors coupled to the memory, the one or more processors configured to: receive, from a repeater node, a signal for self-interference measurement of the repeater node; and determine self-interference of the repeater node based at least in part on reception of one or more of a copy of the signal or an indication of a parameter of the signal that is based at least in part on the reception of the signal by the repeater node.

In some aspects, a non-transitory computer-readable medium storing a set of instructions for wireless communication includes one or more instructions that, when executed by one or more processors of a control node, cause the control node to: transmit, to a repeater node, full duplex configuration information; and determine, based at least in part on a signal transmitted by the repeater node, a self-interference of the repeater node associated with the signal.

In some aspects, a non-transitory computer-readable medium storing a set of instructions for wireless communication includes one or more instructions that, when executed by one or more processors of a repeater node, cause the repeater node to: transmit and receive a signal for self-interference measurement; and transmit, to a control node, one or more of a copy of the signal or an indication of a parameter of the signal based at least in part on the reception of the signal.

In some aspects, a non-transitory computer-readable medium storing a set of instructions for wireless communication includes: one or more instructions that, when executed by one or more processors of a control node, cause the control node to: receive, from a repeater node, a signal for self-interference measurement of the repeater node; and determine self-interference of the repeater node based at least in part on reception of one or more of a copy of the signal or an indication of a parameter of the signal that is based at least in part on the reception of the signal by the repeater node.

In some aspects, an apparatus for wireless communication includes: means for transmitting, to a repeater node, full duplex configuration information; and means for determining, based at least in part on a signal transmitted by the repeater node, a self-interference of the repeater node associated with the signal.

In some aspects, an apparatus for wireless communication includes: means for transmitting and receiving a signal for self-interference measurement; and means for transmitting, to a control node, one or more of a copy of the signal or an indication of a parameter of the signal based at least in part on the reception of the signal.

In some aspects, an apparatus for wireless communication includes: means for receiving, from a repeater node, a signal for self-interference measurement of the repeater node; and means for determining self-interference of the repeater node based at least in part on reception of one or more of a copy of the signal or an indication of a parameter of the signal that is based at least in part on the reception of the signal by the repeater node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
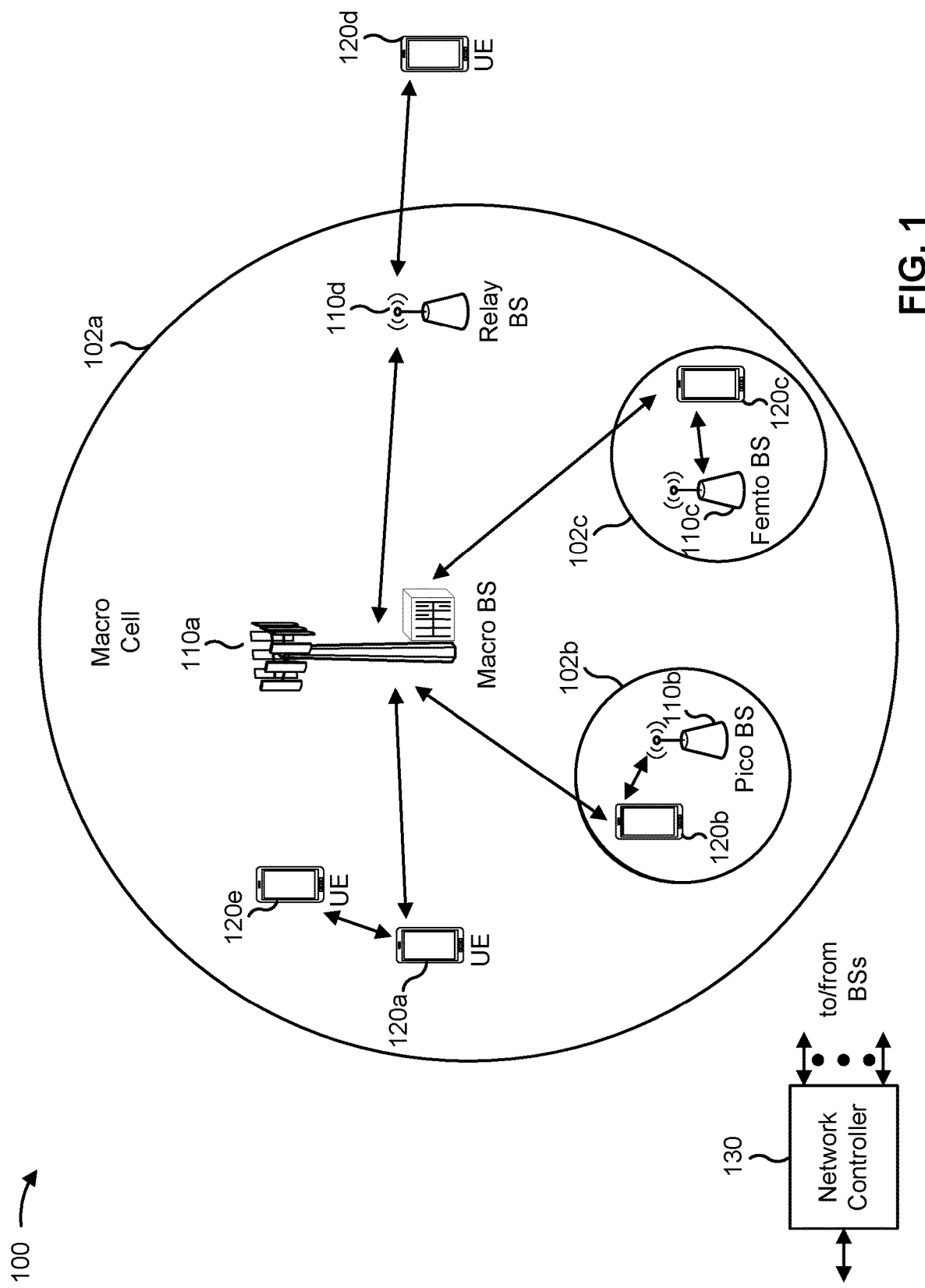
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations (BS) 110 (shown as BS 110a, BS 110b, BS 110c, and BS 110d) and other network entities. A BS is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
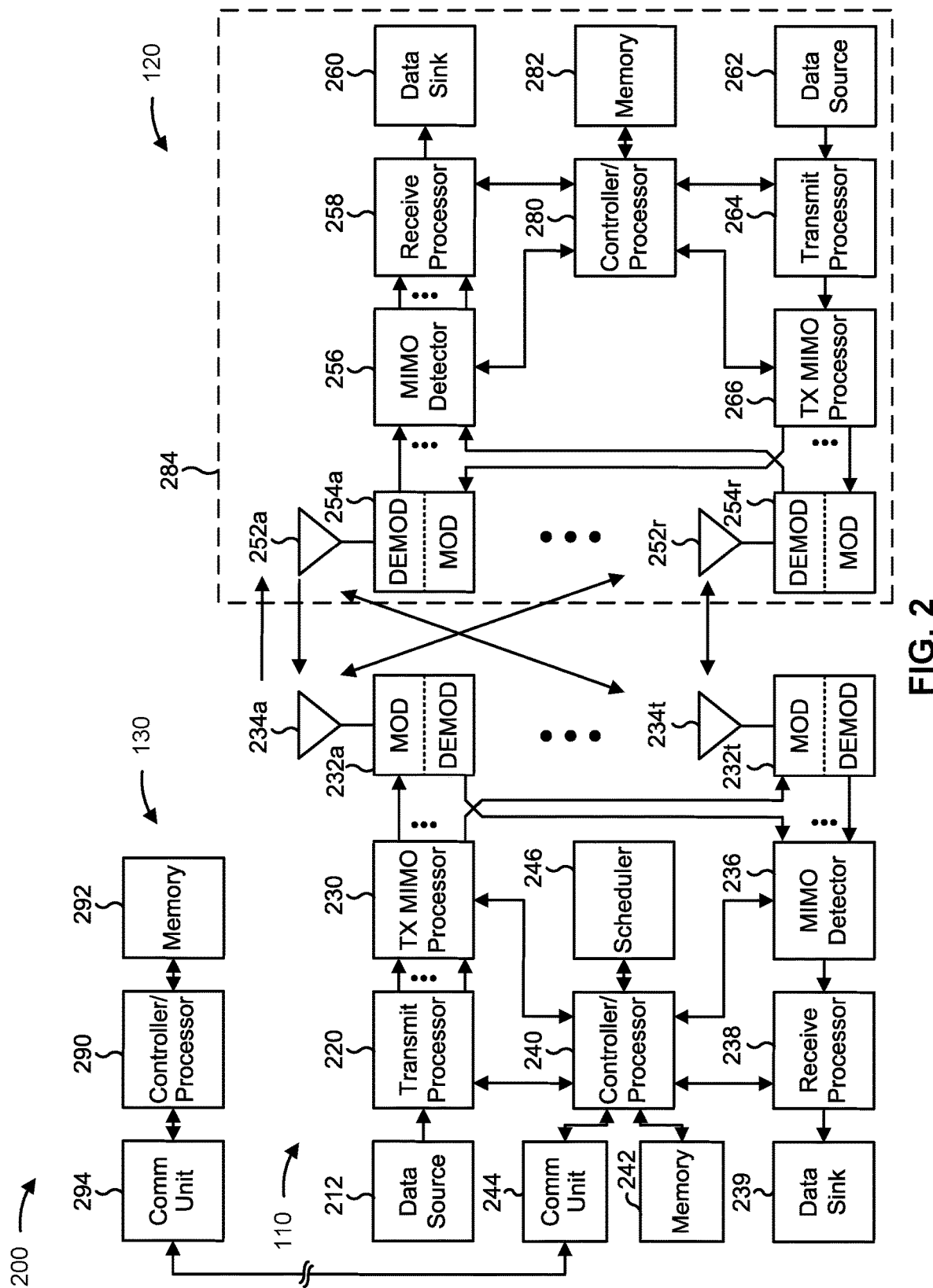
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with self-interference measurement for a repeater node, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions.

In some aspects, a control node (e.g., a base station 110) may include means for transmitting, to a repeater node, full duplex configuration information; means for determining, based at least in part on a signal transmitted by the repeater node, a self-interference of the repeater node associated with the signal; and/or the like. In some aspects, the control node may include means for receiving, from a repeater node, a signal for self-interference measurement of the repeater node; means for determining self-interference of the repeater node based at least in part on reception of one or more of a copy of the signal or an indication of a parameter of the signal that is based at least in part on the reception of the signal by the repeater node; and or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a repeater node (e.g., a base station 110) may include means for transmitting and receiving a signal for self-interference measurement; means for transmitting, to a control node, one or more of a copy of the signal or an indication of a parameter of the signal based at least in part on the reception of the signal; and or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
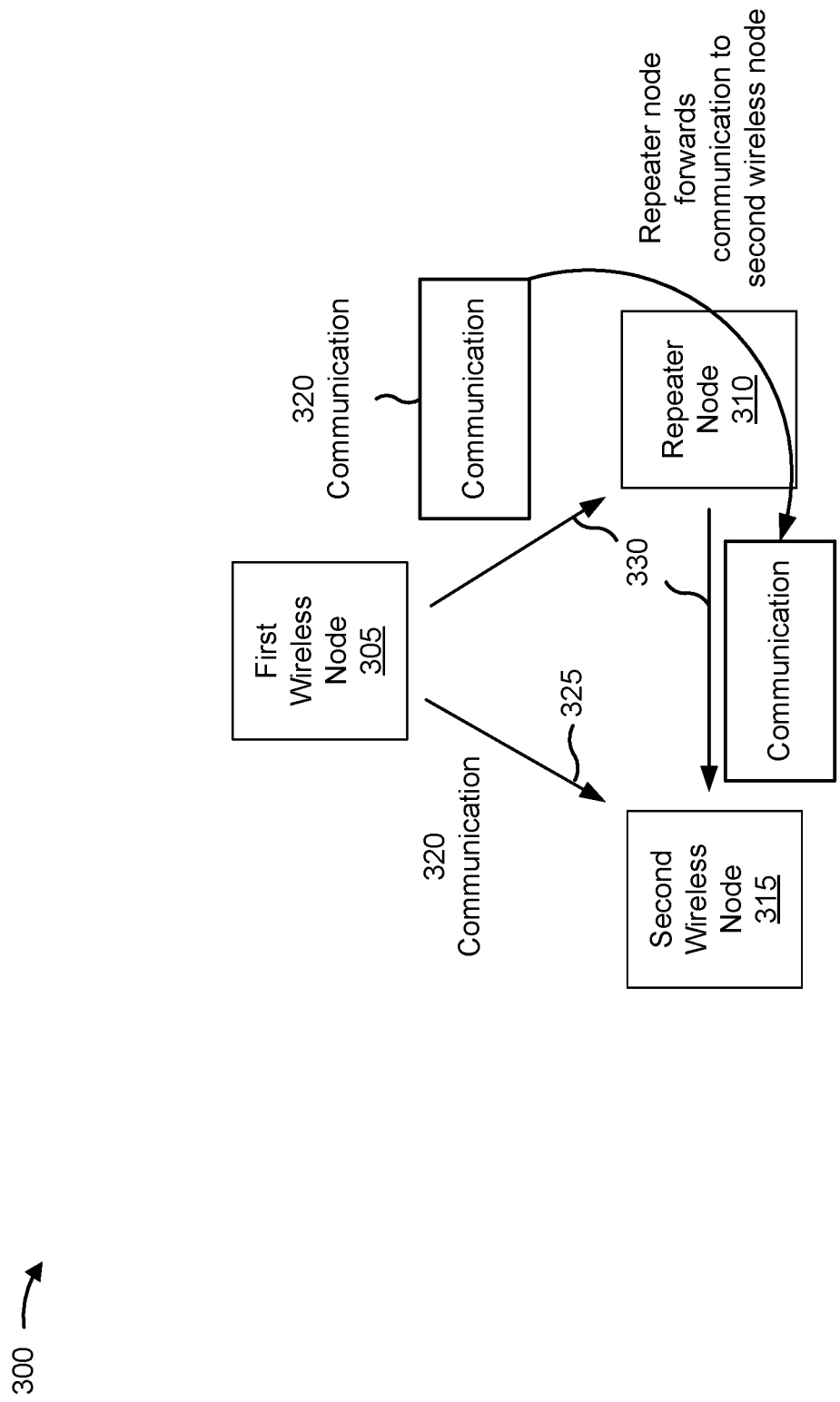
FIG. 3 is a diagram illustrating an example of a repeater node that forwards communications between a first wireless node and a second wireless node, in accordance with the present disclosure.

FIG. 3 is a diagram illustrating an example 300 of a repeater node (also referred to herein as a "repeater") that forwards communications between a first wireless node and a second wireless node, in accordance with the present disclosure. As shown, example 300 includes a first wireless node 305 (e.g., an integrated access and backhaul (IAB) node, an IAB donor, a base station 110, and UE 120, and/or the like), a repeater node 310 (e.g., a repeater device, a base station 110, a UE 120, a millimeter wave repeater, a digital repeater, an analog repeater, and/or the like), and a second wireless node 315 (e.g., an IAB node, an IAB donor, a base station 110, and UE 120, another repeater node 310, and/or the like). In example 300, the first wireless node 305 and/or a second wireless node may be aware of the repeater node 310. In some aspects, the first wireless node 305 and/or a second wireless node may be unaware of the repeater node 310.

As shown in FIG. 3, the first wireless node 305 may want to transmit a communication 320 (e.g., a data communication, a control communication, and/or the like) to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like.

Therefore, the first wireless node 305 may communicate with the second wireless node 315 using an indirect link 330. For example, the first wireless node 305 may transmit the communication 320 to the repeater node 310. In some aspects, the first wireless node 305 may transmit the communication 320 directly to the repeater node 310 (e.g., when the first wireless node 305 is aware of the repeater node 310). In some aspects, the repeater node 310 may be configured (e.g., by a control node, by the second wireless node 315, and/or the like) to receive the communication 320 from the first wireless node 305 (e.g., when the first wireless node 305 is unaware of the repeater node 310).

As shown in FIG. 3, the communication 320 may pass through the repeater node 310 and be forwarded by the repeater node 310. For example, the repeater node 310 may receive the communication 320 and may re-generate a signal of the communication 320 based at least in part on the communication 320. In some cases, an indirect link 330 may be an access link, a side link, or a fronthaul link. For example, if the first wireless node 305 is a base station 110 and the second wireless node 315 is a UE 120, the indirect link 330 between the first wireless node 305 and the repeater node 310 may be a fronthaul link. The indirect link 330 between the repeater node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

As indicated above, FIG. 3 is provided as an example. Other examples may differ from what is described with respect to FIG. 3.

Figure 4:
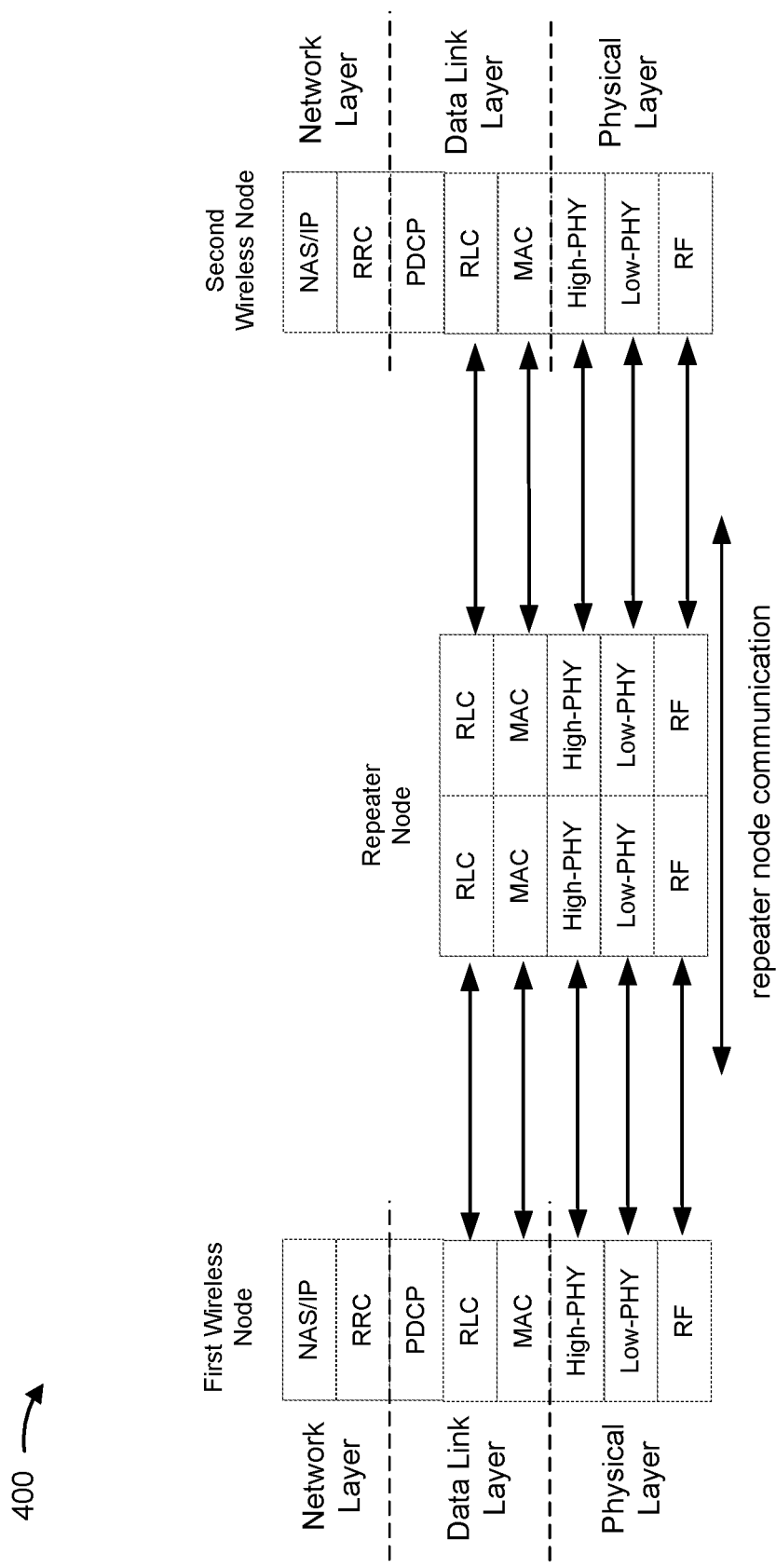
FIG. 4 is a diagram illustrating an example of a protocol stack for repeating communications between a first wireless node and second wireless node, in accordance with the present disclosure.

FIG. 4 is a diagram illustrating an example 400 of a protocol stack for repeating communications between a first wireless node and second wireless node, in accordance with the present disclosure. In some aspects, the first wireless node may be the first wireless node 305 and the second wireless node may be the second wireless node 315. In some aspects, the first wireless node and the second wireless node may communicate with a repeater node (e.g., repeater node 310 and/or the like).

As shown in FIG. 4, an NR protocol stack implemented on a first wireless node and on a second wireless node includes a network layer (e.g., Layer 3), a data link layer (e.g., Layer 2) and a physical layer (e.g., Layer 1). The network layer may include a non-access stratum (NAS) layer, an internet protocol (IP) layer, a radio resource control (RRC) layer, and/or the like. The data link layer may include a packet data convergence protocol (PDCP) layer, a radio link control (RLC), a medium access control (MAC), and/or the like. The physical layer may include a high-physical (PHY) layer, a low-PHY layer, a radio frequency (RF) layer, and/or the like. In some aspects, the PDCP layer on a wireless node may include an adaptation sub-layer (e.g., a service data adaptation protocol (SDAP) sub-layer) and/or the like.

In some aspects, such as in an IAB network, the NAS layer, the IP layer, the RRC layer, the PDCP layer, and/or the like may be included in a central unit (CU) of an IAB donor. The remaining layers (e.g., the RLC layer, the MAC layer, the high-PHY layer, the low-PHY layer, the RF layer, and/or the like) may be included in a distributed unit (DU) of an IAB donor and/or of an IAB node.

When communicating directly with the second wireless node, the first wireless node may communicate at an RLC layer, a MAC layer, a high-PHY layer, a low-PHY layer, an RF layer, and/or the like. As shown in FIG. 4, the layers in the first wireless node may communicate with corresponding layers in the second wireless node. However, in a repeating scenario, the first wireless node may communicate via a link (e.g., an access link, a fronthaul link, and/or the like) with a repeater node. For example, to enable Layer 2 repeating (e.g., data link layer repeating) between the first wireless node and the second wireless node, the repeater node may include an RLC layer, a MAC layer, a high-PHY layer, a low-PHY layer, and an RF layer to communicate with a corresponding RLC layer, MAC layer, high-PHY layer, low-PHY layer, and RF layer of the first wireless node and second wireless node. Based at least in part on passing information between these layers, the repeater node enables Layer 2 repeating between the first wireless node and the second wireless node.

In some aspects, the repeater node may utilize Layer 1 repeating (e.g., physical layer repeating). For example, the repeater node may not include an RLC layer or a MAC layer. As the repeater node may not include an RLC or MAC layer, the repeater node may be configured and/or scheduled by a control node (e.g., a CU, an IAB donor, and IAB node, a base station 110, the first wireless node, the second wireless node, and/or the like). The repeater node may communicate with the first wireless node and the second wireless node at the physical layer only (e.g., rather than the data link layer and the physical layer). Based at least in part on passing information between these layers, the repeater node enables Layer 1 repeating between the first wireless node and the second wireless node.

As indicated above, FIG. 4 is provided as an example. Other examples may differ from what is described with respect to FIG. 4.

Figure 5:
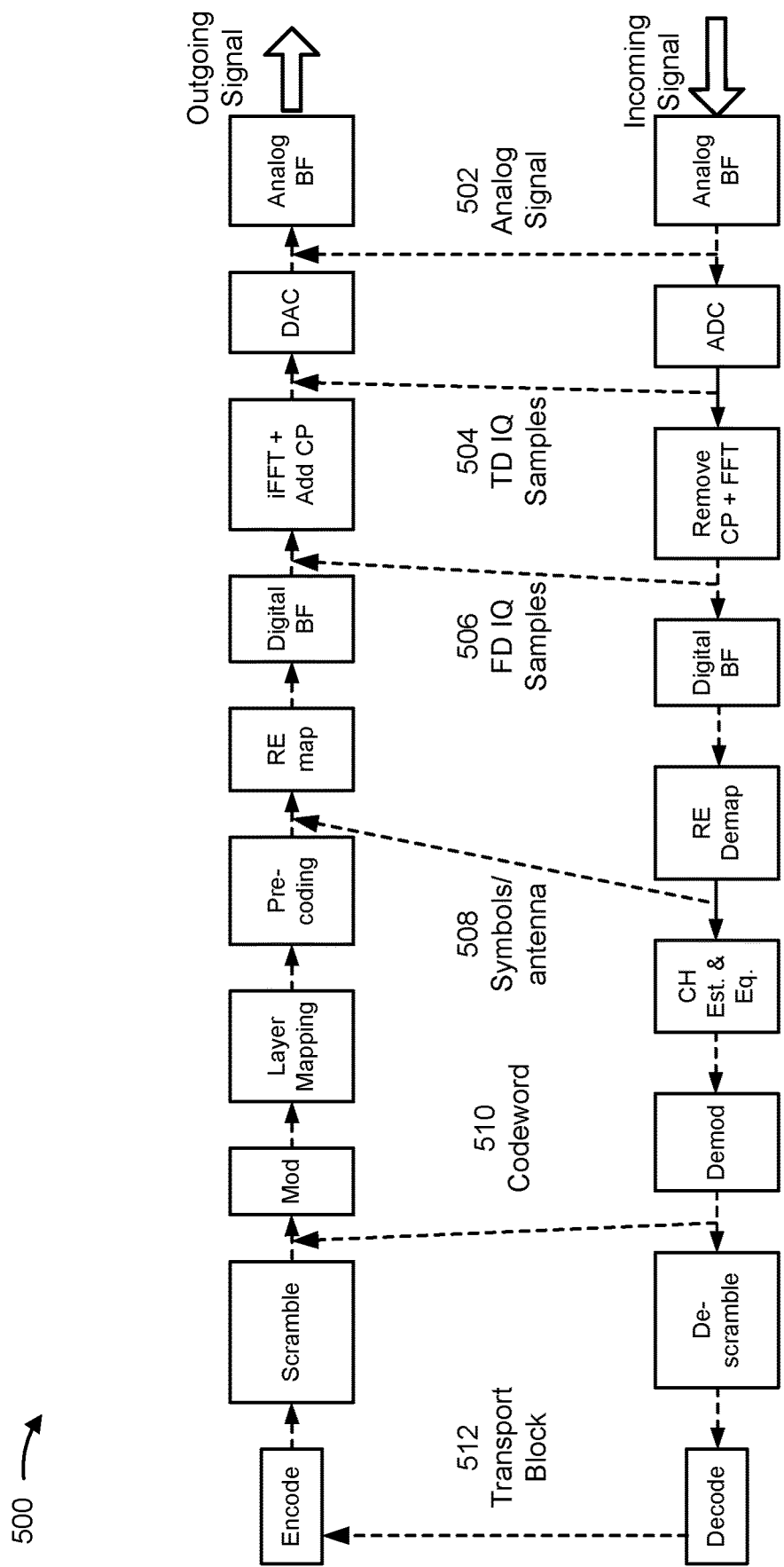
FIG. 5 is a diagram illustrating an example of techniques for processing operations for a repeating operation performed by a repeater node, in accordance with the present disclosure.

FIG. 5 is a diagram illustrating an example 500 of processing operations for a repeating operation performed by a repeater node, in accordance with the present disclosure. A repeating operation may include a repeater node receiving a signal from a first wireless node, processing the signal, re-generating the same signal based at least in part on the processing of the signal, or transmitting the re-generated signal to a second wireless node. In this way, the repeater node may repeat the signal received from the first wireless node to the second wireless node.

As shown by reference number 502, the repeater node may receive an incoming signal from a first wireless node and may perform an analog beamforming procedure to obtain an analog signal associated with the incoming signal. The repeater node may extract the analog signal and may re-generate the analog signal in a transmit (Tx) chain of the repeater node. For example, the repeater node may perform an analog beamforming procedure on the analog signal to form the outgoing signal (e.g., the repeater node may boost the analog signal, apply an analog beamforming gain, and/or the like). The repeater node may transmit the outgoing signal to a second wireless node. A repeater node that operates in this manner may be referred to as an analog repeater device (e.g., as the incoming signal is not converted from the analog domain to the digital domain).

As shown by reference number 504, after receiving the incoming signal and performing an analog beamforming procedure associated with the incoming signal, the repeater node may convert the incoming signal from the analog domain to the digital domain using an analog-to-digital converter (ADC). After converting the incoming signal from the analog domain to the digital domain, the repeater node may determine one or more time domain in-phase/quadrature (IQ) samples associated with the incoming signal. The repeater node may extract the time domain IQ samples and may store the time domain IQ samples in a buffer of the repeater node. The repeater node may use the time domain IQ samples to regenerate the incoming signal in the Tx chain of the repeater node (e.g., immediately after extracting the time domain IQ samples or at a later time). For example, the repeater node may convert the time domain IQ samples from the digital domain to the analog domain using a digital-to-analog converter (DAC). The repeater node may perform an analog beamforming procedure on the analog signal to form the outgoing signal. The repeater node may transmit the outgoing signal to a second wireless node.

As shown by reference number 506, after converting the incoming signal from the analog domain to the digital domain, the repeater node may remove a cyclic prefix (CP) associated with the incoming signal and perform a fast-Fourier transform (FFT) on the incoming signal. After removing the CP and performing the FFT associated with the incoming signal, the repeater node may determine one or more frequency domain IQ samples associated with the incoming signal. The repeater node may extract the frequency domain IQ samples and may store the frequency domain IQ samples in a buffer of the repeater node. The repeater node may use the frequency domain IQ samples to regenerate the incoming signal in the Tx chain of the repeater node (e.g., immediately after extracting the frequency domain IQ samples or at a later time). For example, the repeater node may perform an inverse FFT (iFFT) operation on the frequency domain IQ samples, in order to generate time domain IQ samples. The repeater node may add a CP to the time domain IQ samples. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 508, after removing the CP and performing FFT associated with the incoming signal, the repeater node may perform a digital beamforming procedure associated with the incoming signal. The repeater node may perform a resource element (RE) de-mapping operation associated with the incoming signal. After performing the digital beamforming procedure and the RE de-mapping procedure, the repeater node may determine one or more IQ samples of occupied tones (e.g., a quantity of symbols per antenna element) associated with the incoming signal. The repeater node may extract the IQ samples of occupied tones and may store the IQ samples of occupied tones in a buffer of the repeater node. The repeater node may use the IQ samples of occupied tones to regenerate the incoming signal in the Tx chain of the repeater node (e.g., immediately after extracting the IQ samples of occupied tones or at a later time). For example, the repeater node may perform an RE mapping procedure (e.g., the inverse of the RE de-mapping procedure) associated with the IQ samples of occupied tones. The repeater node may perform a digital beamforming procedure associated with the IQ samples of occupied tones. After performing the digital beamforming procedure, the repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 510, after performing the digital beamforming procedure and the RE de-mapping operation, the repeater node may perform channel estimation and equalization associated with the incoming signal (e.g., to determine and/or remove noise and wireless channel variations associated with the incoming signal). The repeater node may perform a demodulation operation associated with the incoming signal. After performing channel estimation and equalization and the demodulation operation, the repeater node may determine a codeword associated with the incoming signal. The repeater node may extract the codeword and may store the codeword in a buffer of the repeater node. The repeater node may use the codeword to regenerate the incoming signal in the Tx chain of the repeater node (e.g., immediately after extracting the codeword or at a later time). For example, the repeater node may perform a modulation operation, a layer mapping operation, a pre-coding operation, an RE-mapping operation, and/or a digital beamforming procedure associated with the codeword. The repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

As shown by reference number 512, after performing the channel estimation and equalization and demodulation operation associated with the incoming signal, the repeater node may perform a de-scrambling operation (e.g., using scrambling identifiers associated with the incoming signal). The repeater node may decode the incoming signal in accordance with a network coding scheme associated with the incoming signal. After decoding the incoming signal, the repeater node may determine a transport block associated with the incoming signal. The repeater node may extract the transport block and may store the transport block in a buffer of the repeater node. The repeater node may use the transport block to regenerate the incoming signal in the Tx chain of the repeater node (e.g., immediately after extracting the transport block or at a later time). For example, the repeater node may encode the transport block (e.g., in accordance with the network coding scheme) and scramble the encoded transport block. The repeater node may perform a modulation operation, a layer mapping operation, a pre-coding operation, an RE-mapping operation, and/or a digital beamforming procedure associated with the scrambled transport block. The repeater node may perform an iFFT procedure and add a CP to the signal. The repeater node may convert the digital signal from the digital domain to the analog domain using the DAC. The repeater node may perform an analog beamforming procedure on the analog signal to form the outgoing signal. The repeater node may transmit the outgoing signal to a second wireless node.

The different operations described above may be configured by a control node associated with the repeater node. For example, a level of processing (e.g., as shown by reference numbers 502, 504, 506, 508, 510, and 512) may be indicated to the repeater node by the control node. A repeater node that performs processing of an incoming signal after converting the signal to the digital domain may be referred to as a digital repeater device. For example, a repeater node that performs the operations described above with respect to reference numbers 504, 506, 508, 510, or 512 may be referred to as a digital repeater device.

The number and arrangement of components shown in FIG. 5 is provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally or alternatively, a set of components (e.g., one or more components) shown in FIG. 5 may perform one or more functions described as being performed by another set of components shown in FIG. 5.

In some wireless networks, a repeater node that operates in a full duplex configuration may be affected by self-interference and/or clutter reflections. In other words, a first signal transmitted by the repeater node may interfere with a second signal that is simultaneously received by the repeater node. The self-interference and/or clutter reflections may reduce a signal-to-interference-plus noise ratio (SINR) of the signal as received by the receiver, which may cause communication errors, consumption of increased network resources to communicate using the reduced SINR, and/or the like.

In some aspects described herein, a control node associated with a repeater node may transmit full duplex configuration information to the repeater node. The configuration may indicate parameters for repeating a signal, such as a receive beam, a transmit beam, and/or the like for the repeater node to use for receiving and transmitting the signal. In some aspects, the control node, a transmitter node, and/or the like may provide the signal to the repeater node, the repeater node may receive and transmit the signal based at least in part on the full duplex configuration information, and the control node or a receiver node may receive the signal from the repeater node. Based at least in part on the signal, as received by the control node or the receiver node, the control node may determine an effective channel that includes the repeater node, a self-interference of the repeater node, and/or the like.

In some aspects described herein, the repeater node may transmit a signal to the control node or a receiver node and simultaneously receive the signal. The repeater node may transmit a copy of the signal and/or an indication of a parameter of the signal to the control node based at least in part on the reception of the signal. The control node may determine self-interference of the repeater node based at least in part on reception of the copy of the signal (e.g., compared to reception of the signal), the indication of the parameter of the signal (e.g., a parameter that indicates self-interference), and/or the like.

In this way, the control node may determine self-interference of the repeater node (e.g., associated with a configured transmit beam and a configured receive beam of the repeater node). The control node may use the self-interference of the repeater node to reconfigure the repeater node for receiving and/or transmitting signals between a first node and a second node. The reconfiguration may reduce the self-interference and/or clutter reflections and may improve an SINR of the signal as received by the receiver, which may reduce communication errors, reduce consumption of network resources, and/or the like.

Figure 6:
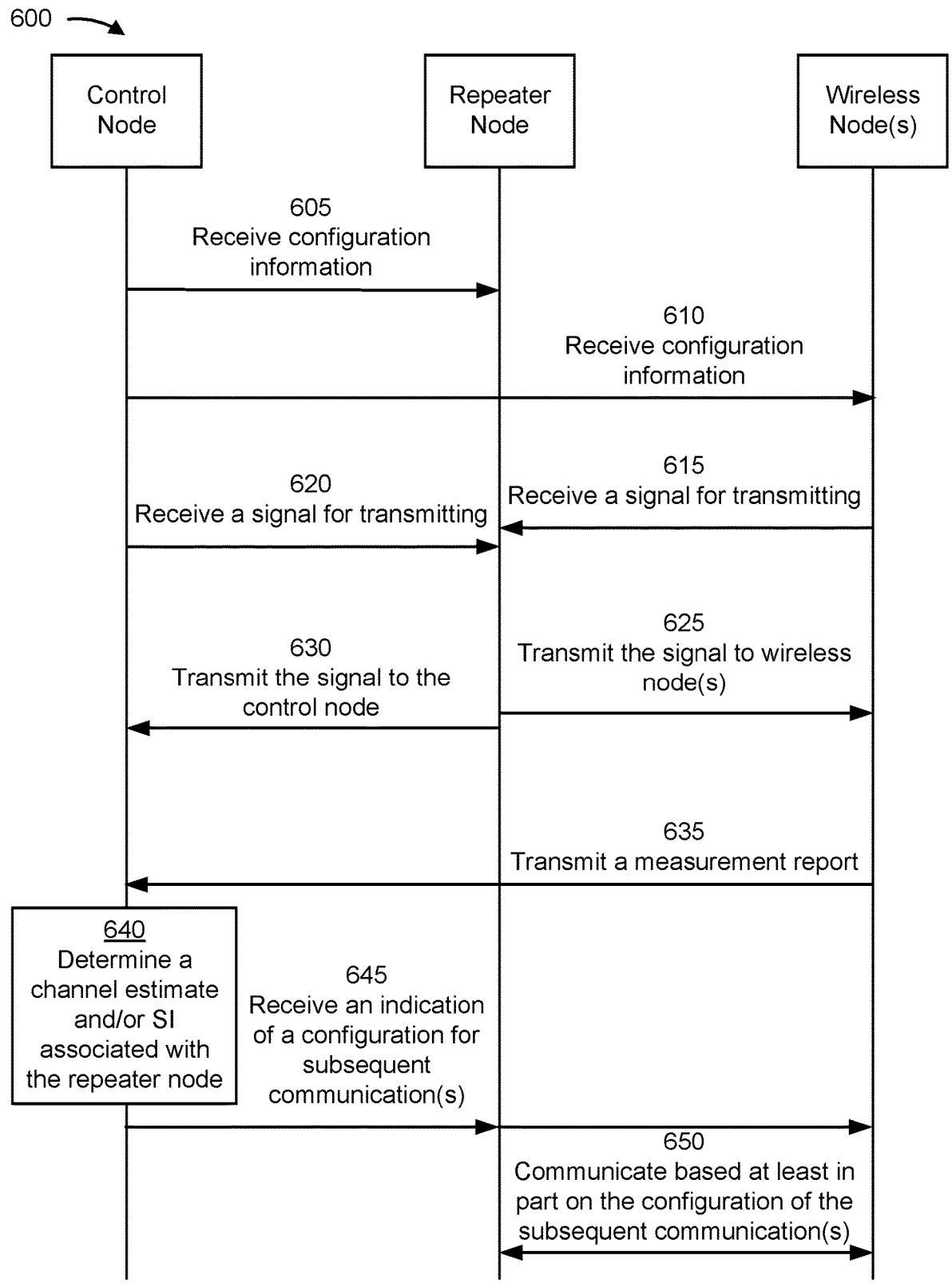
FIGS. 6 and 7 are diagrams illustrating examples associated with techniques for self-interference measurement for a repeater node, in accordance with the present disclosure.

FIG. 6 is a diagram illustrating an example 600 associated with techniques for self-interference measurement for a repeater node, in accordance with the present disclosure. As shown in FIG. 6, a control node (e.g., a base station 110) may communicate with a repeater node (e.g., a base station 110) and/or one or more wireless nodes. The one or more wireless nodes may include a transmitter node, a receiver node, and/or the like. The control node, the repeater node, and the one or more wireless nodes may be part of a wireless network (e.g., wireless network 100).

As shown by reference number 605, the control node may transmit, and the repeater node may receive, configuration information. In some aspects, the repeater node may receive configuration information from another device (e.g., from the one or more wireless nodes and/or the like), a communication standard (e.g., a telecommunication standard), and/or the like. In some aspects, the repeater node may receive the configuration information via one or more of RRC signaling, MAC signaling (e.g., MAC control elements (MAC CEs)), downlink control information (DCI), and/or the like. In some aspects, the configuration information may include an indication of one or more configuration parameters (e.g., already known to the repeater node) for selection by the repeater node, explicit configuration information for the repeater node to use to configure the repeater node, and/or the like.

In some aspects, the configuration information may indicate that the repeater node is to receive one or more signals via a receive beam and transmit one or more signals via a transmit beam. In some aspects, the configuration information may indicate one or more additional parameters for operating as a repeater node, such as a transmit power for transmitting a signal, a duplexing mode, and/or the like. In some aspects, the configuration information may indicate that the repeater node is to generate the signal independently from receiving the signal from another node (e.g., the control node, a transmitter node, and/or the like).

As shown by reference number 610, the control node may transmit, and at least one of the one or more wireless nodes may receive, configuration information. In some aspects, the at least one of the wireless nodes may receive configuration information from another device (e.g., from the one or more wireless nodes and/or the like), a communication standard (e.g., a telecommunication standard), another control node, the repeater node, and/or the like. In some aspects, the at least one of the one or more wireless nodes may receive the configuration information via one or more of RRC signaling, MAC signaling, DCI, and/or the like. In some aspects, the configuration information may include an indication of one or more configuration parameters (e.g., already known to the at least one of the one or more wireless nodes) for selection by the at least one of the one or more wireless nodes, explicit configuration information for the at least one of the one or more wireless nodes to use to configure the at least one of the one or more wireless nodes, and/or the like.

In some aspects, the configuration information may indicate that a transmitter node, of the at least one of the one or more wireless nodes, is to transmit a signal to the repeater node based at least in part on a full duplex configuration of the repeater node. In some aspects, the configuration information may indicate that a receiver node, of the at least one of the one or more wireless nodes, is to receive the signal from the repeater node based at least in part on the full duplex configuration of the repeater node. In some aspects, the configuration information may indicate that a receiver node is to measure the signal from the repeater node, estimate a channel between the transmitter node and the receiver node (e.g., including forwarding by the repeater node), transmit a measurement report to the control node, and/or the like.

As shown by reference number 615, the repeater node may receive a signal from a transmitter node of the one or more wireless nodes. Additionally, or alternatively, as shown by reference number 620, the repeater node may receive a signal from the control node. In some aspects, the repeater node may be configured to perform one or more processing operations on the signal, as described herein (e.g., with reference to FIG. 5). In some aspects, the repeater node may be configured to transmit the signal in an analog repeater node mode based at least in part on receiving the signal.

Additionally, or alternatively, the repeater node may be configured (e.g., based at least in part on the configuration information) to regenerate the signal based at least in part on receiving the signal from the transmitter node or the control node, to generate the signal independently from, or in absence of, receiving the signal from the transmitter node or the control node.

As shown by reference number 625, the repeater node may transmit the signal to at least one of the one or more wireless nodes. For example, the repeater node may transmit the signal to a receiver node. Additionally, or alternatively, as shown by reference number 630, the repeater node may transmit the signal to the control node.

As shown by reference number 635, at least one of the one or more wireless nodes may transmit a measurement report to the control node. For example, a receiver node may transmit the measurement report to the control node. In some aspects, the receiver node may measure the signal from the repeater node, estimate a channel between the transmitter node and the receiver node (e.g., including forwarding by the repeater node), transmit the measurement report to the control node based at least in part on measuring the signal, or/or the like.

As shown by reference number 640, the control node may determine a channel estimate for the channel between the transmitter node and the receiver node, a self-interference associated with the receiver node, and/or the like. In some aspects, the control node may determine the self-interference associated with the receiver node based at least in part on channel information associated with channels between the repeater node and the transmitter node, and between the repeater node and the receiver node. For example, the control node may determine a first channel effect of a first channel over which the repeater node receives the signal, and a second channel effect of a second channel over which the repeater node transmits the signal (e.g., to the receiver node).

As shown by reference number 645, the repeater node may receive, from the control node, an indication of a configuration for one or more subsequent communications. The control node may transmit the configuration based at least in part on a self-interference of the repeater node (e.g., associated with the signal). The configuration may include a configuration of time-domain resources for the one or more subsequent communications, a configuration of frequency-domain resources for the one or more subsequent communications, and/or a configuration of power resources for the one or more subsequent communications, among other examples. For example, the configuration may include parameters to reduce and/or manage the self-interference of the repeater node.

Additionally, or alternatively, the control node may transmit the indication of the configuration to at least one of the one or more wireless nodes (e.g., a transmitter node and/or an receiver node). For example, the control node may schedule resources (e.g., in time and/or frequency) that is based at least in part on the self-interference of the repeater node. In some aspects, the repeater node may receive the indication of the configuration and may forward the configuration to the one or more wireless nodes (e.g., with reading the configuration or without reading the configuration).

As shown by reference number 650, the repeater node and the one or more wireless nodes may communicate based at least in part on the configuration of the one or more subsequent communications. For example, a transmitter node may transmit the one or more subsequent communications to a receiver node via the repeater node. The one or more subsequent communications may use resources indicated by the configuration.

In this way, the control node may determine self-interference of the repeater node. The control node may use the self-interference of the repeater node to reconfigure the repeater node for receiving and/or transmitting signals between the transmitter node and the receiver node. The reconfiguration may reduce the self-interference and/or clutter reflections and may improve an SINR of the signal as received by the receiver, which may reduce communication errors, reduce consumption of network resources, and/or the like.

As indicated above, FIG. 6 is provided as an example. Other examples may differ from what is described with respect to FIG. 6.

Figure 7:
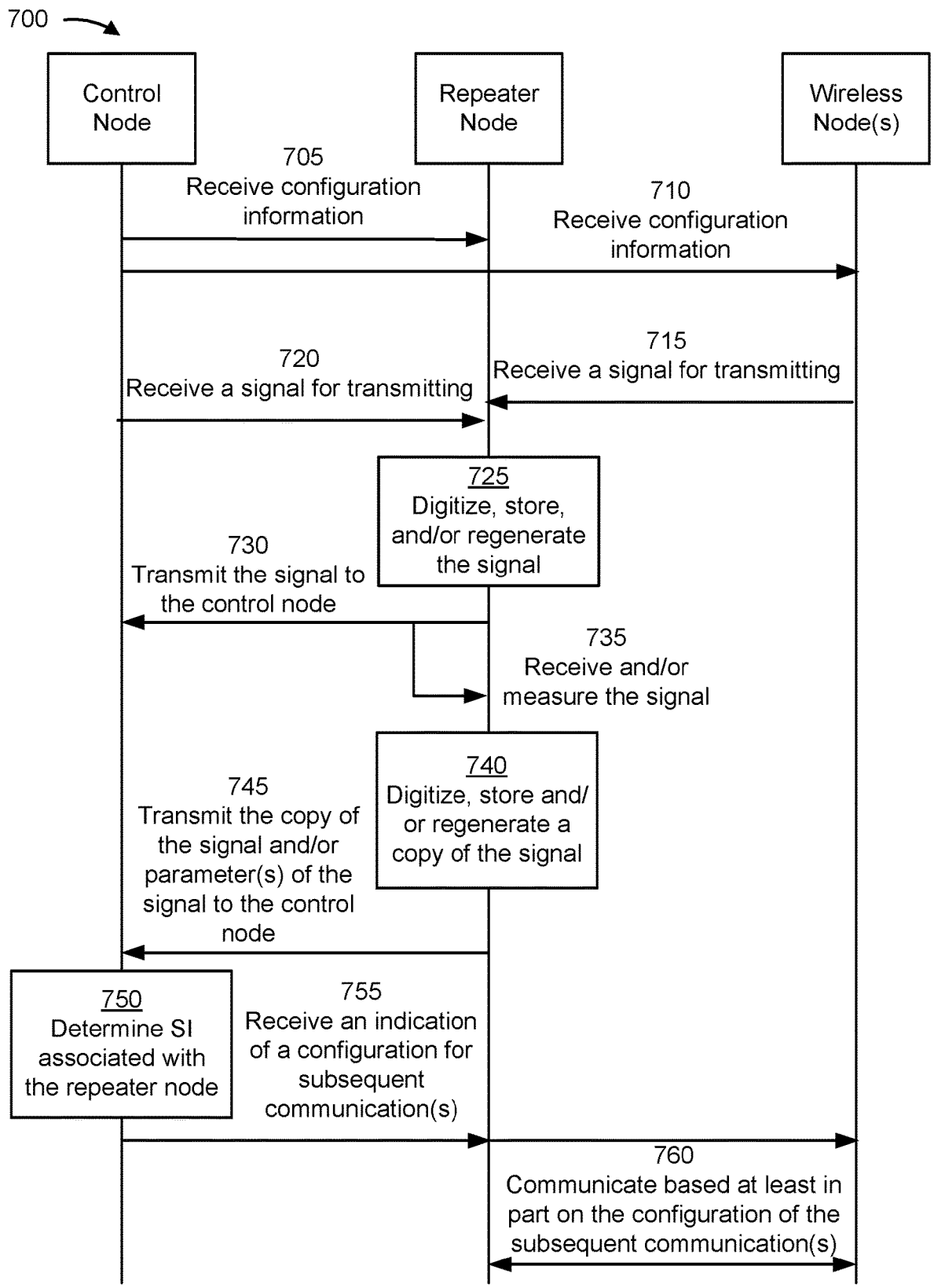

FIG. 7 is a diagram illustrating an example 700 associated with techniques for self-interference measurement for a repeater node, in accordance with the present disclosure. As shown in FIG. 7, a control node (e.g., a base station 110) may communicate with a repeater node (e.g., a base station 110) and/or one or more wireless nodes. The one or more wireless nodes may include a transmitter node, a receiver node, and/or the like. The control node, the repeater node, and the one or more wireless nodes may be part of a wireless network (e.g., wireless network 100).

As shown by reference number 705, the control node may transmit, and the repeater node may receive, configuration information. In some aspects, the repeater node may receive configuration information from another device (e.g., from the one or more wireless nodes and/or the like), a communication standard (e.g., a telecommunication standard), and/or the like. In some aspects, the repeater node may receive the configuration information via one or more of RRC signaling, MAC CEs, DCI, and/or the like. In some aspects, the configuration information may include an indication of one or more configuration parameters (e.g., already known to the repeater node) for selection by the repeater node, explicit configuration information for the repeater node to use to configure the repeater node, and/or the like.

In some aspects, the configuration information may indicate that the repeater node is to receive one or more signals via a receive beam and transmit one or more signals via a transmit beam. In some aspects, the configuration information may indicate one or more additional parameters for operating as a repeater node, such as a transmit power for transmitting a signal, a duplexing mode, and/or the like. In some aspects, the configuration information may indicate that the repeater node is to generate the signal independently from receiving the signal from another node (e.g., the control node, a transmitter node, and/or the like).

In some aspects, the configuration information may indicate that the repeater node is to transmit a signal and receive the signal (e.g., simultaneously) using a configured transmit beam and a configured receive beam for self-interference measurement. In some aspects, the configuration information may indicate that the repeater node is to transmit, to the control node, a copy of the signal (e.g., as received while transmitting the signal), an indication of a parameter of the signal, or/or the like.

As shown by reference number 710, the control node may transmit, and at least one of the one or more wireless nodes may receive, configuration information. In some aspects, the at least one of the wireless nodes may receive configuration information from another device (e.g., from the one or more wireless nodes and/or the like), a communication standard (e.g., a telecommunication standard), another control node, the repeater node, and/or the like. In some aspects, the at least one of the one or more wireless nodes may receive the configuration information via one or more of RRC signaling, MAC signaling, DCI, and/or the like. In some aspects, the configuration information may include an indication of one or more configuration parameters (e.g., already known to the at least one of the one or more wireless nodes) for selection by the at least one of the one or more wireless nodes, explicit configuration information for the at least one of the one or more wireless nodes to use to configure the at least one of the one or more wireless nodes, and/or the like.

In some aspects, the configuration information may indicate that a transmitter node, of the at least one of the one or more wireless nodes, is to transmit a signal to the repeater node based at least in part on a full duplex configuration of the repeater node.

As shown by reference number 715, the repeater node may receive a signal from a transmitter node of the one or more wireless nodes. Additionally, or alternatively, as shown by reference number 720, the repeater node may receive a signal from the control node.

As shown by reference number 725, the repeater node may digitize, store, and/or regenerate the signal for transmission. In some aspects, the repeater node may be configured to perform one or more processing operations on the signal, as described herein (e.g., with reference to FIG. 5).

Additionally, or alternatively, the repeater node may be configured (e.g., based at least in part on the configuration information) to generate the signal independently from, or in absence of, receiving the signal from the transmitter node or the control node.

As shown by reference number 730, the repeater node may transmit the signal to the control node. As shown by reference number 735, the repeater node may receive and/or measure the signal based at least in part on transmitting the signal to the control node. In some aspects, the repeater node may transmit the signal via a first antenna panel and receive the signal via a second panel. In some aspects, the repeater node may determine a parameter of the signal (e.g., associated with self-interference) based at least in part on transmitting the signal and receiving the signal. For example, the repeater node may determine an SINR associated with the signal.

As shown by reference number 740, the repeater node may digitize, store, and/or regenerate a copy of the signal for transmission. In some aspects, the repeater node may be configured to perform one or more processing operations on the signal, as described herein (e.g., with reference to FIG. 5).

As shown by reference number 745, the repeater node may transmit the copy of the signal and/or one or more parameters of the signal to the control node. In some aspects, the repeater node may not be capable of determining self-interference and may transmit the copy of the signal for the control node to compare with the signal (e.g., as received as described with respect to reference number 730). In some aspects, the repeater node may be capable of determining self-interference, but may be subject to control information from the control node. By providing the one or more parameters associated with self-interference, the control node may be apprised of the self-interference and may reconfigure the repeater node to reduce self-interference.

As shown by reference number 750, the control node may determine the self-interference associated with the repeater node. In some aspects, the control node may receive the one or more parameters of the signal that indicate self-interference of the repeater node. In some aspects, the control node may determine the self-interference based at least in part on the copy of the signal for the control node and the signal.

As shown by reference number 755, the repeater node may receive, from the control node, an indication of a configuration for one or more subsequent communications. The control node may transmit the configuration based at least in part on a self-interference of the repeater node (e.g., associated with the signal). The configuration may include a configuration of time-domain resources for the one or more subsequent communications, a configuration of frequency-domain resources for the one or more subsequent communications, and/or a configuration of power resources for the one or more subsequent communications, among other examples. For example, the configuration may include parameters to reduce and/or manage the self-interference of the repeater node.

Additionally, or alternatively, the control node may transmit the indication of the configuration to at least one of the one or more wireless nodes (e.g., a transmitter node and/or a receiver node). For example, the control node may schedule resources (e.g., in time and/or frequency) that is based at least in part on the self-interference of the repeater node. In some aspects, the repeater node may receive the indication of the configuration and may forward the configuration to the one or more wireless nodes (e.g., with reading the configuration or without reading the configuration).

As shown by reference number 760, the repeater node and the one or more wireless nodes may communicate based at least in part on the configuration of the one or more subsequent communications. For example, a transmitter node may transmit the one or more subsequent communications to a receiver node via the repeater node. The one or more subsequent communications may use resources indicated by the configuration.

In this way, the control node may determine self-interference of the repeater node. The control node may use the self-interference of the repeater node to reconfigure the repeater node for receiving and/or transmitting signals between the transmitter node and a receiver node. The reconfiguration may reduce the self-interference and/or clutter reflections and may improve an SINK of the signal as received by the receiver, which may reduce communication errors, reduce consumption of network resources, and/or the like.

As indicated above, FIG. 7 is provided as an example. Other examples may differ from what is described with respect to FIG. 7.

Figure 8:
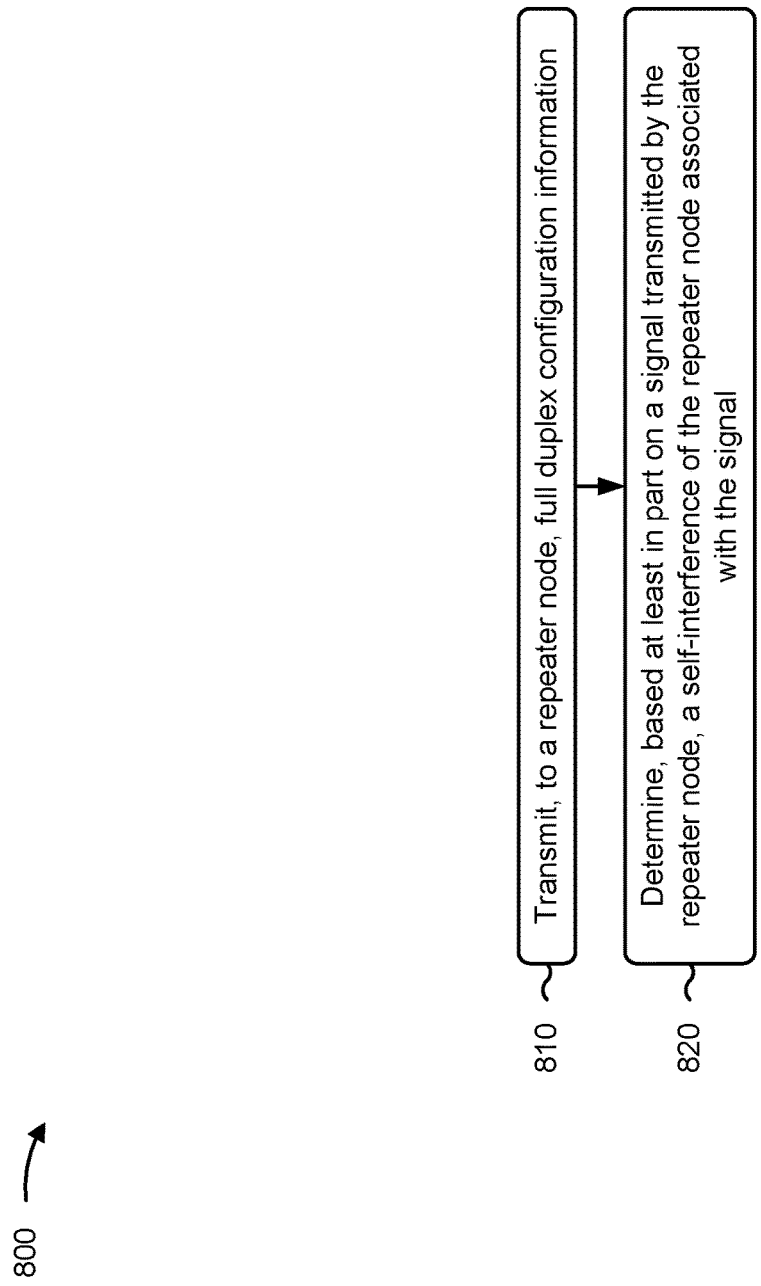
FIGS. 8-10 are diagrams illustrating example processes associated with techniques for self-interference measurement for a repeater node, in accordance with the present disclosure.

FIG. 8 is a diagram illustrating an example process 800 performed, for example, by a control node, in accordance with the present disclosure. Example process 800 is an example where the control node (e.g., base station 110, apparatus 1100 (described below), and/or the like) performs operations associated with self-interference measurement for a repeater node.

As shown in FIG. 8, in some aspects, process 800 may include transmitting, to a repeater node, full duplex configuration information (block 810). For example, the control node (e.g., using transmission component 1104 of apparatus 1100) may transmit, to a repeater node, full duplex configuration information, as described above.

As further shown in FIG. 8, in some aspects, process 800 may include determining, based at least in part on a signal transmitted by the repeater node, a self-interference of the repeater node associated with the signal (block 820). For example, the control node (e.g., using determination component 1108 of apparatus 1100) may determine, based at least in part on a signal transmitted by the repeater node, a self-interference of the repeater node associated with the signal, as described above.

Process 800 may include additional aspects, such as any single aspect or any combination of aspects described below and/or in connection with one or more other processes described elsewhere herein.

In a first aspect, process 800 includes one or more of: transmitting, to the repeater node, the signal; transmitting, to a transmitter node, an indication to transmit the signal based at least in part on the full duplex configuration information; or transmitting, to a receiver node, an indication to receive the signal based at least in part on the full duplex configuration information.

In a second aspect, alone or in combination with the first aspect, the full duplex configuration information includes one or more of: an indication of a receive beam for receiving the signal, an indication of a transmit beam for transmitting the signal, or an indication of a transmit power for transmitting the signal.

In a third aspect, alone or in combination with one or more of the first and second aspects, process 800 includes one or more of receiving, from the repeater node, the signal transmitted by the repeater node, or receiving, from a receiver node, a measurement of the signal transmitted by the repeater node.

In a fourth aspect, alone or in combination with one or more of the first through third aspects, the repeater node is configured to transmit the signal in an analog repeater node mode.

In a fifth aspect, alone or in combination with one or more of the first through fourth aspects, process 800 includes determining a first channel effect of a first channel over which the repeater node receives the signal, and determining a second channel effect of a second channel over which the repeater node transmits the signal, wherein the determination of the self-interference of the repeater node associated with the signal is based at least in part on the determination of the first channel effect and the determination of the second channel effect.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
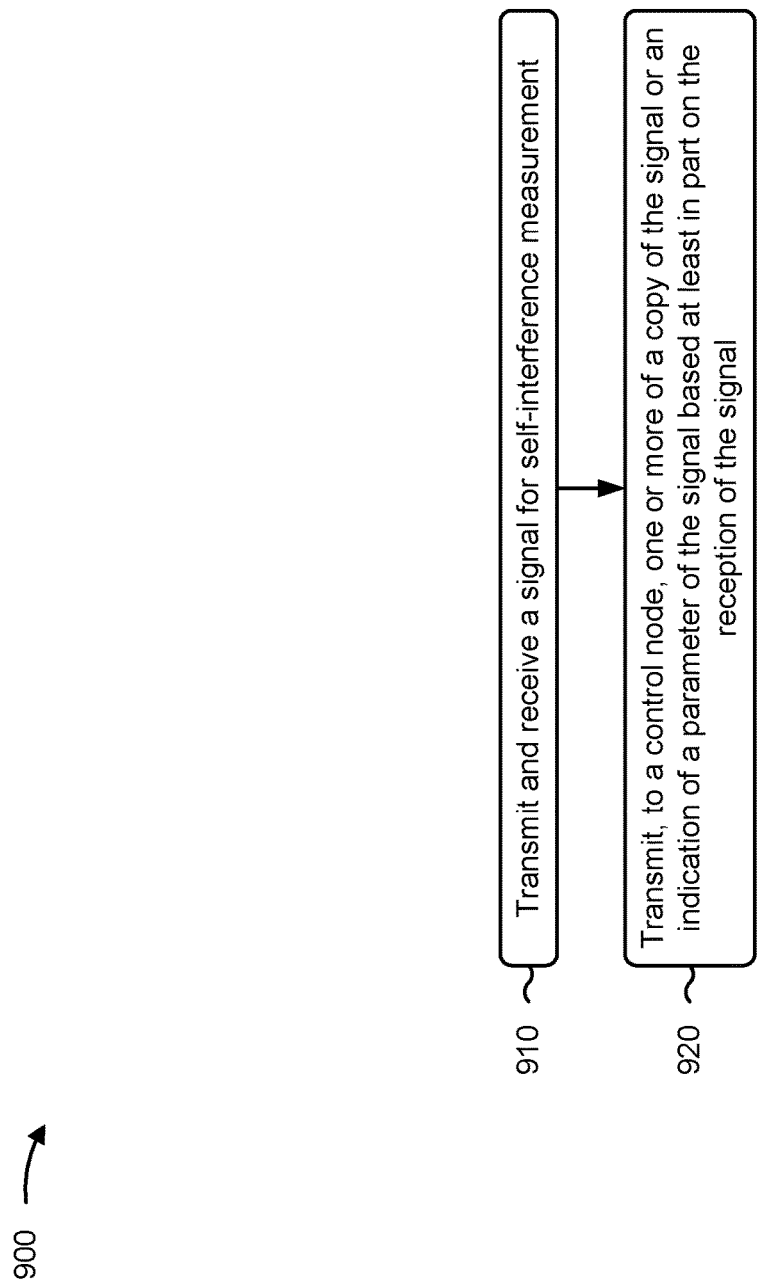

FIG. 9 is a diagram illustrating an example process 900 performed, for example, by a repeater node, in accordance with the present disclosure. Example process 900 is an example where the repeater node (e.g., base station 110, apparatus 1200 (described below), and/or the like) performs operations associated with techniques for self-interference measurement for a repeater node.

As shown in FIG. 9, in some aspects, process 900 may include transmitting and receiving a signal for self-interference measurement (block 910). For example, the repeater node (e.g., using transmission component 1204 of apparatus 1200) may transmit and receive a signal for self-interference measurement, as described above.

As further shown in FIG. 9, in some aspects, process 900 may include transmitting, to a control node, one or more of a copy of the signal or an indication of a parameter of the signal based at least in part on the reception of the signal (block 920). For example, the repeater node (e.g., using transmission component 1204 of apparatus 1200) may transmit, to a control node, one or more of a copy of the signal or an indication of a parameter of the signal based at least in part on the reception of the signal, as described above.

Process 900 may include additional aspects, such as any single aspect or any combination of aspects described below and/or in connection with one or more other processes described elsewhere herein.

In a first aspect, transmitting and receiving the signal for self-interference measurement includes transmitting the signal via a first antenna panel, and receiving the signal via a second antenna panel.

In a second aspect, alone or in combination with the first aspect, process 900 includes one or more of receiving, before transmitting and receiving the signal for self-interference measurement, the signal via a transmitter node, digitizing the signal, storing the signal, or regenerating the signal.

In a third aspect, alone or in combination with one or more of the first and second aspects, process 900 includes generating, before transmitting and receiving the signal for self-interference measurement, the signal.

In a fourth aspect, alone or in combination with one or more of the first through third aspects, process 900 includes digitizing the signal, storing the signal, or regenerating the signal.

In a fifth aspect, alone or in combination with one or more of the first through fourth aspects, the indication of the parameter of the signal based at least in part on the reception of the signal includes one or more of: an RSSI, an indication of a total received power in a baseband, an indication of a received power on resources occupied by the signal, an indication of an RSRP of the signal, or a measurement of self-interference that is based at least in part on a measurement of the signal as received by the repeater node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
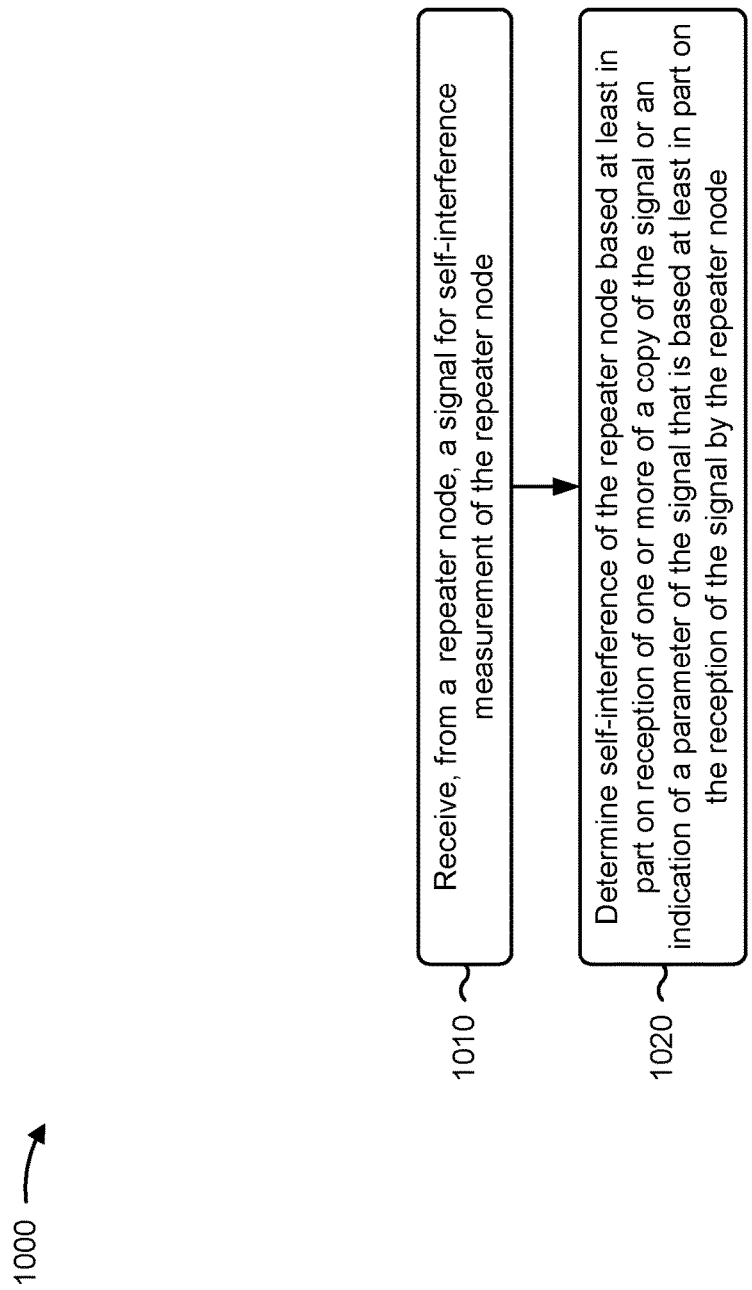

FIG. 10 is a diagram illustrating an example process 1000 performed, for example, by a control node, in accordance with the present disclosure. Example process 1000 is an example where the control node (e.g., base station 110, apparatus 1100, and/or the like) performs operations associated with techniques for self-interference measurement for a repeater node.

As shown in FIG. 10, in some aspects, process 1000 may include receiving, from a repeater node, a signal for self-interference measurement of the repeater node (block 1010). For example, the control node (e.g., using reception component 1102) may receive, from a repeater node, a signal for self-interference measurement of the repeater node, as described above.

As further shown in FIG. 10, in some aspects, process 1000 may include determining self-interference of the repeater node based at least in part on reception of one or more of a copy of the signal or an indication of a parameter of the signal that is based at least in part on the reception of the signal by the repeater node (block 1020). For example, the control node (e.g., using determination component 1108) may determine self-interference of the repeater node based at least in part on reception of one or more of a copy of the signal or an indication of a parameter of the signal that is based at least in part on the reception of the signal by the repeater node, as described above.

Process 1000 may include additional aspects, such as any single aspect or any combination of aspects described below and/or in connection with one or more other processes described elsewhere herein.

In a first aspect, process 1000 includes one or more of: transmitting, before receiving the signal for self-interference measurement, the signal to the repeater node; transmitting, before receiving the signal for self-interference measurement, an indication for a transmitter node to transmit the signal to the repeater node; or transmitting, before receiving the signal for self-interference measurement, an indication for the repeater node to generate and transmit the signal.

In a second aspect, alone or in combination with the first aspect, process 1000 includes transmitting, before receiving the signal for self-interference measurement, configuration information for determining self-interference of the repeater node.

In a third aspect, alone or in combination with one or more of the first and second aspects, the indication of the parameter of the signal based at least in part on the reception of the signal by the repeater node includes one or more of: an RSSI, an indication of a total received power in a baseband, an indication of a received power on resources occupied by the signal, an indication of an RSRP of the signal, or a measurement of self-interference based at least in part on a measurement, by the repeater node, based at least in part on the reception of the signal by the repeater node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
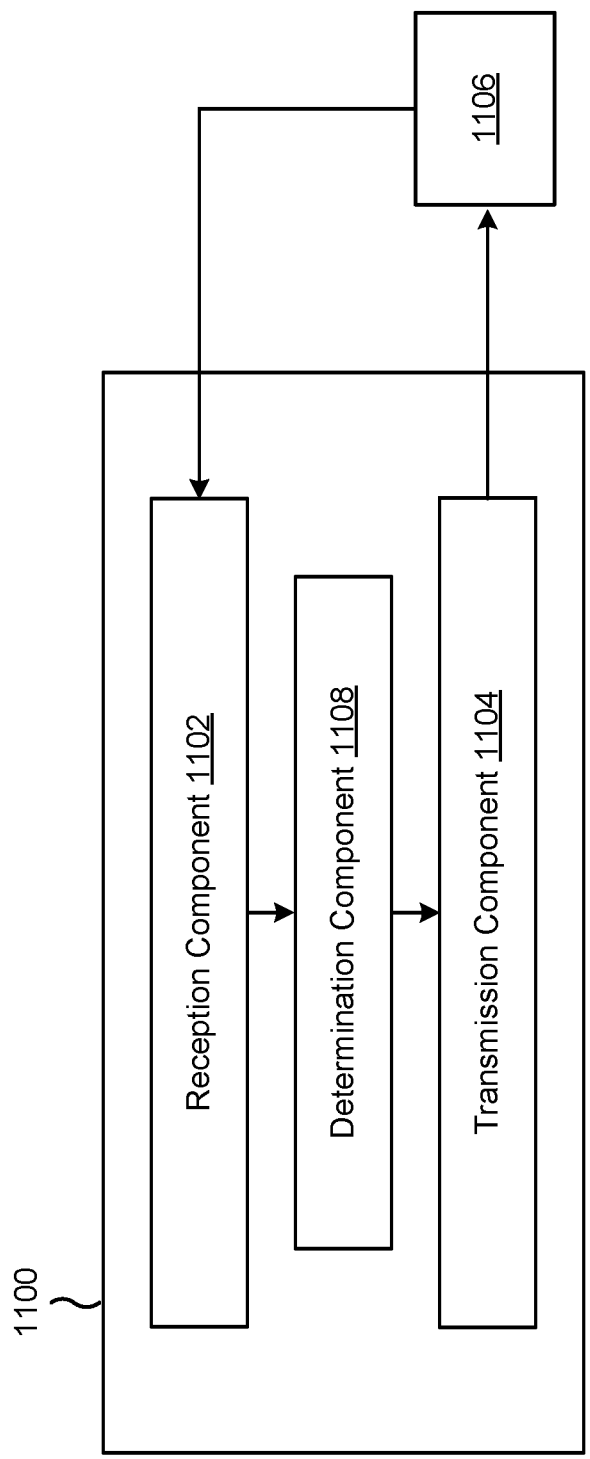
FIGS. 11 and 12 are block diagrams of example apparatuses for wireless communication, in accordance with the present disclosure.

FIG. 11 is a block diagram of an example apparatus 1100 for wireless communication. The apparatus 1100 may be a control node, or a control node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 3-7. Additionally or alternatively, the apparatus 1100 may be configured to perform one or more processes described herein, such as process 800 of FIG. 8, process 1000 of FIG. 10, or a combination thereof. In some aspects, the apparatus 1100 and/or one or more components shown in FIG. 11 may include one or more components of a control node and/or a base station 110 described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the control node described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the control node described above in connection with FIG. 2. In some aspects, the transmission component 1104 may be collocated with the reception component 1102 in a transceiver.

The transmission component 1104 may transmit, to a repeater node, full duplex configuration information. The determination component 1108 may determine, based at least in part on a signal transmitted by the repeater node, a self-interference of the repeater node associated with the signal. The determination component 1108 may determine a first channel effect of a first channel over which the repeater node receives the signal. The determination component 1108 may determine a second channel effect of a second channel over which the repeater node transmits the signal, wherein the determination of the self-interference of the repeater node associated with the signal is based at least in part on the determination of the first channel effect and the determination of the second channel effect. In some aspects, the determination component 1108 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

The transmission component 1104 may transmit and receive a signal for self-interference measurement. The transmission component 1104 may transmit, to a control node, one or more of a copy of the signal or an indication of a parameter of the signal based at least in part on the reception of the signal.

The reception component 1102 may receive, from a repeater node, a signal for self-interference measurement of the repeater node. The determination component 1108 may determine self-interference of the repeater node based at least in part on reception of one or more of a copy of the signal or an indication of a parameter of the signal that is based at least in part on the reception of the signal by the repeater node. In some aspects, the determination component 1108 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

The transmission component 1104 may transmit, before receiving the signal for self-interference measurement, configuration information for determining self-interference of the repeater node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
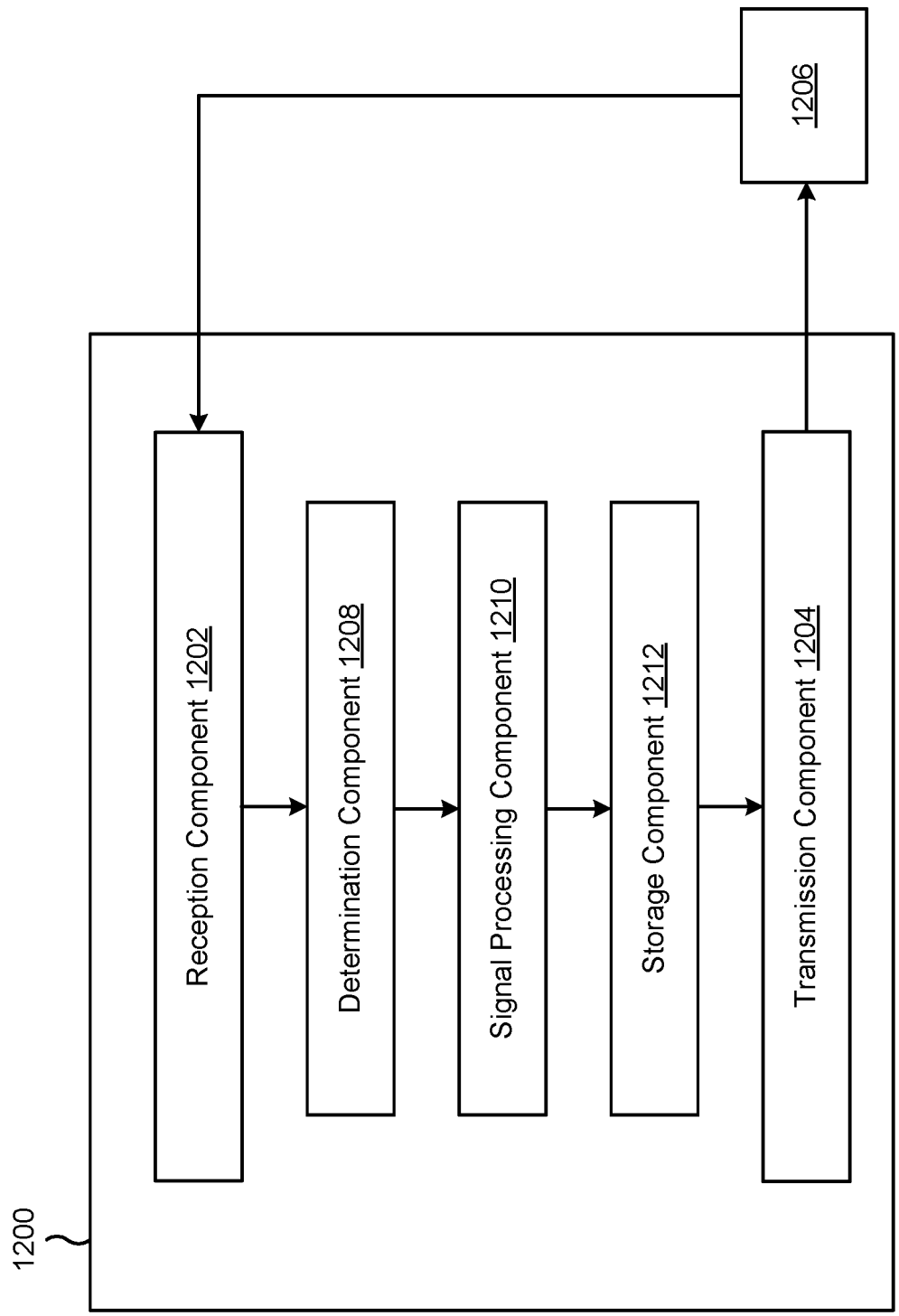

FIG. 12 is a block diagram of an example apparatus 1200 for wireless communication. The apparatus 1200 may be a repeater node, or a repeater node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208, a signal processing component 1210, or a storage component 1212, among other examples.

In some aspects, the apparatus 1200 may be configured to perform one or more operations described herein in connection with FIGS. 3-7. Additionally or alternatively, the apparatus 1200 may be configured to perform one or more processes described herein, such as process 900 of FIG. 9. In some aspects, the apparatus 1200 and/or one or more components shown in FIG. 12 may include one or more components of a repeater node and/or a base station 110 described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the repeater node described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the repeater node described above in connection with FIG. 2. In some aspects, the transmission component 1204 may be collocated with the reception component 1202 in a transceiver.

The signal processing component 1210 may digitize the signal. The signal processing component 1210 may regenerate the signal. The signal processing component 1210 may generate, before transmitting and receiving the signal for self-interference measurement, the signal. In some aspects, the signal processing component 1210 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

The storage component 1212 may store the signal. In some aspects, the storage component 1212 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a control node, comprising: transmitting, to a repeater node, full duplex configuration information; and determining, based at least in part on a signal transmitted by the repeater node, a self-interference of the repeater node associated with the signal.

Aspect 2: The method of Aspect 1, further comprising one or more of: transmitting, to the repeater node, the signal; transmitting, to a transmitter node, an indication to transmit the signal based at least in part on the full duplex configuration information; or transmitting, to a receiver node, an indication to receive the signal based at least in part on the full duplex configuration information.

Aspect 3: The method of any of Aspects 1-2, wherein the full duplex configuration information comprises one or more of: an indication of a receive beam for receiving the signal, an indication of a transmit beam for transmitting the signal, or an indication of a transmit power for transmitting the signal.

Aspect 4: The method of any of Aspects 1-3, further comprising one or more of: receiving, from the repeater node, the signal transmitted by the repeater node; or receiving, from a receiver node, a measurement of the signal transmitted by the repeater node.

Aspect 5: The method of any of Aspects 1-4, wherein the repeater node is configured to transmit the signal in an analog repeater node mode.

Aspect 6: The method of any of Aspects 1-5, further comprising: determining a first channel effect of a first channel over which the repeater node receives the signal; and determining a second channel effect of a second channel over which the repeater node transmits the signal, wherein the determination of the self-interference of the repeater node associated with the signal is based at least in part on the determination of the first channel effect and the determination of the second channel effect.

Aspect 7: The method of any of Aspects 1-6, further comprising: transmitting, to one or more of the repeater node or a transmitter node associated with the repeater node, an indication of a configuration for one or more subsequent communications based at least in part on the self-interference of the repeater node.

Aspect 8: The method of Aspect 7, wherein the configuration for the one or more subsequent communications comprises one or more of: a configuration of time-domain resources for the one or more subsequent communications, a configuration of frequency-domain resources for the one or more subsequent communications, or a configuration of power resources for the one or more subsequent communications.

Aspect 9: A method of wireless communication performed by a repeater node, comprising: transmitting and receiving a signal for self-interference measurement; and transmitting, to a control node, one or more of a copy of the signal or an indication of a parameter of the signal based at least in part on the reception of the signal.

Aspect 10: The method of Aspect 9, wherein transmitting and receiving the signal for self-interference measurement comprises: transmitting the signal via a first antenna panel; and receiving the signal via a second antenna panel.

Aspect 11: The method of any of Aspects 9-10, further comprising one or more of: receiving, before transmitting and receiving the signal for self-interference measurement, the signal via a transmitter node; digitizing the signal; storing the signal; or regenerating the signal.

Aspect 12: The method of any of Aspects 9-11, further comprising: generating, before transmitting and receiving the signal for self-interference measurement, the signal.

Aspect 13: The method of any of Aspects 9-12, further comprising, after receiving the signal for self-interference measurement and before transmitting the copy of the signal, one or more of: digitizing the signal; storing the signal; or regenerating the signal.

Aspect 14: The method of any of Aspects 9-13, wherein the indication of the parameter of the signal based at least in part on the reception of the signal comprises one or more of: a received signal strength indicator, an indication of a total received power in a baseband, an indication of a received power on resources occupied by the signal, an indication of a reference signal received power of the signal, or a measurement of self-interference that is based at least in part on a measurement of the signal as received by the repeater node.

Aspect 15: The method of any of Aspects 9-14, further comprising: receiving an indication of a configuration for one or more subsequent communications based at least in part on a self-interference of the repeater node that is based at least in part on the signal for self-interference measurement.

Aspect 16: The method of Aspect 15, wherein the configuration for the one or more subsequent communications comprises one or more of: a configuration of time-domain resources for the one or more subsequent communications, a configuration of frequency-domain resources for the one or more subsequent communications, or a configuration of power resources for the one or more subsequent communications.

Aspect 17: A method of wireless communication performed by a control node, comprising: receiving, from a repeater node, a signal for self-interference measurement of the repeater node; and determining self-interference of the repeater node based at least in part on reception of one or more of a copy of the signal or an indication of a parameter of the signal that is based at least in part on the reception of the signal by the repeater node.

Aspect 18: The method of Aspect 17, further comprising one or more of: transmitting, before receiving the signal for self-interference measurement, the signal to the repeater node; transmitting, before receiving the signal for self-interference measurement, an indication for a transmitter node to transmit the signal to the repeater node; or transmitting, before receiving the signal for self-interference measurement, an indication for the repeater node to generate and transmit the signal.

Aspect 19: The method of any of Aspects 17-18, further comprising: transmitting, before receiving the signal for self-interference measurement, configuration information for determining self-interference of the repeater node.

Aspect 20: The method of any of Aspects 17-19, wherein the indication of the parameter of the signal based at least in part on the reception of the signal by the repeater node comprises one or more of: a received signal strength indicator, an indication of a total received power in a baseband, an indication of a received power on resources occupied by the signal, an indication of a reference signal received power of the signal, or a measurement of self-interference based at least in part on a measurement, by the repeater node, based at least in part on the reception of the signal by the repeater node.

Aspect 21: The method of any of Aspects 17-20, further comprising: transmitting, to one or more of the repeater node or a transmitter node associated with the repeater node, an indication of a configuration for one or more subsequent communications based at least in part on the self-interference of the repeater node.

Aspect 22: The method of Aspect 21, wherein the configuration for the one or more subsequent communications comprises one or more of: a configuration of time-domain resources for the one or more subsequent communications, a configuration of frequency-domain resources for the one or more subsequent communications, or a configuration of power resources for the one or more subsequent communications.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a repeater node, comprising:
   receiving configuration information associated with self-interference measurement
   transmitting a signal and receiving the signal for the self-interference measurement based at least in part on the configuration information; and
   transmitting, to a control node, one or more of a copy of the signal or an indication of a parameter of the signal based at least in part on the reception of the signal.

2. The method of claim 1, wherein transmitting the signal and receiving the signal for the self-interference measurement comprises:
   transmitting the signal via a first antenna panel; and
   receiving the signal via a second antenna panel.

3. The method of claim 1, further comprising one or more of:
   receiving, before transmitting the signal and receiving the signal for the self-interference measurement, the signal via a transmitter node;
   digitizing the signal;
   storing the signal; or
   regenerating the signal.

4. The method of claim 1, further comprising:
   generating, before transmitting the signal and receiving the signal for the self-interference measurement, the signal for the self-interference measurement.

5. The method of claim 1, further comprising, after receiving the signal for the self-interference measurement and before transmitting the copy of the signal, one or more of:
   digitizing the signal;
   storing the signal; or
   regenerating the signal.

6. The method of claim 1, wherein the indication of the parameter of the signal based at least in part on the reception of the signal comprises one or more of:
   a received signal strength indicator,
   an indication of a total received power in a baseband,
   an indication of a received power on resources occupied by the signal,
   an indication of a reference signal received power of the signal, or
   a measurement of self-interference that is based at least in part on a measurement of the signal as received by the repeater node.

7. The method of claim 1, further comprising:
   receiving an indication of a configuration for one or more subsequent communications based at least in part on a self-interference of the repeater node that is based at least in part on the signal for the self-interference measurement.

8. The method of claim 7, wherein the configuration for the one or more subsequent communications comprises one or more of:
   a configuration of time-domain resources for the one or more subsequent communications,
   a configuration of frequency-domain resources for the one or more subsequent communications, or
   a configuration of power resources for the one or more subsequent communications.

9. An apparatus for wireless communication at a repeater node, comprising:

one or more memories; and
one or more processors, coupled to the one or more memories, configured to:
   receive configuration information associated with self-interference measurement;
   transmit a signal and receive the signal for the self-interference measurement based at least in part on the configuration information; and
   transmit, to a control node, one or more of a copy of the signal or an indication of a parameter of the signal based at least in part on the reception of the signal.

10. The apparatus of claim 9, wherein the one or more processors, to transmit the signal and receive the signal for the self-interference measurement, are configured to:
   transmit the signal via a first antenna panel; and
   receive the signal via a second antenna panel.

11. The apparatus of claim 9, wherein the one or more processors are further configured to:
   receive, before transmission of the signal and reception of the signal for the self-interference measurement, the signal via a transmitter node;
   digitize the signal;
   store the signal; or
   regenerate the signal.

12. The apparatus of claim 9, wherein the one or more processors are further configured to:
   generate, before transmission of the signal and reception of the signal for the self-interference measurement, the signal for the self-interference measurement.

13. The apparatus of claim 9, wherein the one or more processors are further configured to, after reception of the signal for the self-interference measurement and before transmission of the copy of the signal:
   digitize the signal;
   store the signal; or
   regenerate the signal.

14. The apparatus of claim 9, wherein the indication of the parameter of the signal based at least in part on the reception of the signal comprises one or more of:
   a received signal strength indicator,
   an indication of a total received power in a baseband,
   an indication of a received power on resources occupied by the signal,
   an indication of a reference signal received power of the signal, or
   a measurement of self-interference that is based at least in part on a measurement of the signal as received by the repeater node.

15. The apparatus of claim 9, wherein the one or more processors are further configured to:
   receive an indication of a configuration for one or more subsequent communications based at least in part on a self-interference of the repeater node that is based at least in part on the signal for the self-interference measurement.

16. The apparatus of claim 15, wherein the configuration for the one or more subsequent communications comprises one or more of:
   a configuration of time-domain resources for the one or more subsequent communications,
   a configuration of frequency-domain resources for the one or more subsequent communications, or
   a configuration of power resources for the one or more subsequent communications.

17. A non-transitory computer-readable medium storing a set of instructions for wireless communication, the set of instructions comprising:
   one or more instructions that, when executed by one or more processors of a repeater node, cause the repeater node to:
     receive configuration information associated with self-interference measurement;
     transmit a signal and receive the signal for the self-interference measurement based at least in part on the configuration information; and
     transmit, to a control node, one or more of a copy of the signal or an indication of a parameter of the signal based at least in part on the reception of the signal.

18. The non-transitory computer-readable medium of claim 17, wherein the one or more instructions, that cause the repeater node to transmit the signal and receive the signal for the self-interference measurement, cause the repeater node to:
   transmit the signal via a first antenna panel; and
   receive the signal via a second antenna panel.

19. The non-transitory computer-readable medium of claim 17, wherein the one or more instructions further cause the repeater node to:
   receive, before transmission of the signal and reception of the signal for the self-interference measurement, the signal via a transmitter node;
   digitize the signal;
   store the signal; or
   regenerate the signal.

20. The non-transitory computer-readable medium of claim 17, wherein the one or more instructions further cause the repeater node to:
   generate, before transmission of the signal and reception of the signal for the self-interference measurement, the signal for the self-interference measurement.

21. The non-transitory computer-readable medium of claim 17, wherein the one or more instructions further cause the repeater node to, after reception of the signal for the self-interference measurement and before transmission of the copy of the signal:
   digitize the signal;
   store the signal; or
   regenerate the signal.

22. The non-transitory computer-readable medium of claim 17, wherein the indication of the parameter of the signal based at least in part on the reception of the signal comprises one or more of:
   a received signal strength indicator,
   an indication of a total received power in a baseband,
   an indication of a received power on resources occupied by the signal,
   an indication of a reference signal received power of the signal, or
   a measurement of self-interference that is based at least in part on a measurement of the signal as received by the repeater node.

23. The non-transitory computer-readable medium of claim 17, wherein the one or more instructions further cause the repeater node to:
   receive an indication of a configuration for one or more subsequent communications based at least in part on a self-interference of the repeater node that is based at least in part on the signal for the self-interference measurement.

24. An apparatus for wireless communication, comprising:
   means for receiving configuration information associated with self-interference measurement;

means for transmitting a signal and receiving the signal for the self-interference measurement based at least in part on the configuration information; and means for transmitting, to a control node, one or more of a copy of the signal or an indication of a parameter of the signal based at least in part on the reception of the signal.

25. The apparatus of claim 24, wherein the means for transmitting the signal and receiving the signal for the self-interference measurement comprises:

means for transmitting the signal via a first antenna panel; and means for receiving the signal via a second antenna panel.

26. The apparatus of claim 24, further comprising one or more of:

means for receiving, before transmitting the signal and receiving the signal for the self-interference measurement, the signal via a transmitter node;

means for digitizing the signal;

means for storing the signal; or means for regenerating the signal.

27. The apparatus of claim 24, further comprising:

means for generating, before transmitting the signal and receiving the signal for the self-interference measurement, the signal for the self-interference measurement.

28. The apparatus of claim 24, further comprising, after receiving the signal for the self-interference measurement and before transmitting the copy of the signal, one or more of:

means for digitizing the signal;

means for storing the signal; or means for regenerating the signal.

29. The apparatus of claim 24, wherein the indication of the parameter of the signal based at least in part on the reception of the signal comprises one or more of:

a received signal strength indicator, an indication of a total received power in a baseband, an indication of a received power on resources occupied by the signal, an indication of a reference signal received power of the signal, or a measurement of self-interference that is based at least in part on a measurement of the signal as received by the apparatus.

30. The apparatus of claim 24, further comprising:

means for receiving an indication of a configuration for one or more subsequent communications based at least in part on a self-interference of the apparatus that is based at least in part on the signal for the self-interference measurement.

* * * * *